United States Patent [19]
Ellson

[11] Patent Number: 5,381,526
[45] Date of Patent: Jan. 10, 1995

[54] METHOD AND APPARATUS FOR STORING AND RETRIEVING GENERALIZED IMAGE DATA

[75] Inventor: Richard N. Ellson, Rochester, N.Y.

[73] Assignee: Eastman Kodak Company, Rochester, N.Y.

[21] Appl. No.: 943,630

[22] Filed: Sep. 11, 1992

[51] Int. Cl.$^6$ .............................................. G06F 15/62
[52] U.S. Cl. .................................. 395/164; 395/131; 395/162; 358/408
[58] Field of Search ............... 395/131, 160, 161, 162, 395/163, 164, 600; 382/41, 54; 358/403, 408, 443, 444, 447, 448, 302; 340/723, 721, 798–799; 360/131, 135; 345/150, 185

[56] References Cited

U.S. PATENT DOCUMENTS

| | | | |
|---|---|---|---|
| 4,685,068 | 8/1987 | Greco et al. | 382/17 |
| 4,888,648 | 12/1989 | Takeuchi et al. | 358/335 |
| 4,969,204 | 11/1990 | Melnychuck et al. | 382/56 |
| 4,970,666 | 11/1990 | Welsh et al. | 395/142 |
| 5,218,455 | 6/1993 | Kristy | 340/723 |
| 5,241,659 | 8/1993 | Parulski | 395/164 |
| 5,241,671 | 8/1993 | Reed et al. | 364/600 |

FOREIGN PATENT DOCUMENTS

| | | | |
|---|---|---|---|
| 61-214692 | 9/1986 | Japan | H04N 13/00 |
| 1005292 | 1/1989 | Japan | H04N 13/00 |
| 4174652 | 6/1992 | Japan | A61B 6/03 |

OTHER PUBLICATIONS

Systems and Computers in Japan, vol. 21, No. 7, 1990, New York, US, pp. 86–95, Inoue et al, "Component Image Filing System For Image Synthesis" (paragraph 2.2–paragraph 3.1).

Primary Examiner—Mark R. Powell
Assistant Examiner—Kee M. Tung
Attorney, Agent, or Firm—Edward Dugas

[57] ABSTRACT

A method and arrangement for storing or generating images has a processor that receives digital information representing an image or scene, where the digital information includes at least two different image units of the image, each image unit containing different information regarding the image. The processor links the different image units of the image for storage in a database such that the different image units of the image are automatically accessed when the image is accessed. A storage device stores the different image units of the image in a database. An output device produces an output image from the different image units of the image stored in the database. The database is contained on a photographic CD, for example. The linkage of the different image units allows three-dimensional images to be generated, or other manipulations to be performed by a computer graphics processor.

22 Claims, 2 Drawing Sheets

METHOD AND APPARATUS FOR STORING AND RETRIEVING GENERALIZED IMAGE DATA

FIELD OF THE INVENTION

The present invention relates to the field of digital imaging and image model storage, and more particularly, to a method and apparatus for storing and retrieving conventional images associated with each other and with descriptions of the geometry of objects or other properties of objects found within the image.

BACKGROUND OF THE INVENTION

Since the 1970's computer graphics has been a method of generating photorealistic images (see J. Foley and A. VanDam, *Fundamentals of Interactive Computer Graphics*, Addison-Wesley, 1982). Since that time computer graphics has been used in entertainment, advertising, and scientific data analysis. Computer graphics software depends upon an underlying model of image formation which is comprised of surface material properties, the physics of light propagation and object construction. Common computer graphic models are loosely referred to as polygonal rendering, ray-tracing (see A. Glasner, *Ray Tracing*, and radiosity (see *Radiosity*, Course Notes, SIGGRAPH 1991, Las Vegas). Each of these methods has advantages and limitations in achieving photorealism. All of these techniques, however, require data which describes the objects to be rendered.

Conventional two-dimensional color images, such as those from color photographs, have been digitally stored in a variety of digital formats. These formats differ in resolution, algorithms, color space, and bit depth amongst others. One particular format, the photographic compact disk ("photographic CD") image format used in the photographic CD system manufactured by KODAK, is a hierarchical 24-bit method based on a YCC color space. This hierarchical 24-bit method is described in U.S. Pat. No. 4,969,204 to Melnychuck et al., which is herein incorporated by reference.

In this known method, an image is scanned from film or other medium and encoded into a YCC (luminance, chrominance, chrominance) color space that is in a 24-bit format. This encoded image is decomposed into a sequence of image components in a hierarchy of decreasing resolution. The higher resolution images are used for supplying images to high-quality hard-copy devices, or to high-definition television. The lower resolution images are used for the simultaneous display of multiple images, rapidly displaying images on a standard television, etc. The various resolution versions of the image are stored on a digital storage medium, such as a compact disk.

Imaging technology, however, is capable of acquiring and recording many other types of information relating to an image other than the color of image pixels. This other type of data will be collectively referred to as "image model data", while the conventional color information will be referred to as "image data". Numerous methods exist for obtaining information about images or scenes other than the conventional color information. (A "scene" is defined as anything from which an image unit can be recorded whereas an "image" is taken to mean a conventional light recording, such as a photograph.) One such data type is range data. This geometry data of a scene can be collected by a variety of methods including laser range finding, computer-aided tomography, magnetic resonance imaging, active triangulation with coded light stripes, radar, sonar, optical disparity scanning and multiple-position photographic or motion video coupled with computer processing.

Other types of data, such as material properties of objects in an image, reflectivity or transparency of objects, different illumination of objects (such as ultraviolet or infrared), etc. can also be obtained through known sensing techniques.

SUMMARY OF THE INVENTION

There is a need for storing and accessing image model data, as well as image data, in a manner that allows different units of the image model data and the image data to be accessed for reproduction of an image, or for generation or manipulation of an image by a computer graphics processor.

This and other needs are met by the present invention which provides an arrangement for generating images comprising a processor that receives digital information representing an image, where the digital information includes at least two different image units of the image, each image unit containing different information regarding the image. The processor links the different image units of the image for storage in a database such that the different image units of the image are automatically accessed when the image is accessed. A storage device stores the different image units of the image in a database. An output device produces an output image from the different image units of the image stored in the database. In certain embodiments of the invention, the database is contained on a photographic CD.

The present invention also provides a method of storing a plurality of digital image units on a photographic CD, where each image unit is decomposed into a sequence of image components in a hierarchy of decreasing resolution. This method includes the steps of providing digital information representing a plurality of image units to a photographic CD write device, with the plurality of image units representing a single image. This digital information includes information regarding the single image other than luminance and chrominance information. The plurality of image units are written onto the photographic CD to store the image units. In an embodiment of the invention, the plurality of image units representing the single image are linked such that accessing the image from the photographic CD accesses a selected one or more of the plurality of image units. Each image unit can be tagged with a tag representing a type of digital information that the image unit contains, with the one or more of the plurality of image units accessed being selected in accordance with the tags of the image units.

In certain embodiments of the invention, the plurality of image units contain luminance and chrominance information, but may contain image data taken at different orientations of a scene, or at different times.

The present invention allows for the storage of image data and image model data, such as three-dimensional surfaces. The image data stored on a photographic CD in the present invention can be used for display as a conventional image. The image model data can be used either with or without the image data for a variety of purposes, and in particular as the input to a computer graphics system for the generation of a new image. Furthermore, the present invention provides for the image data and image model data to be associated or linked with each other.

An advantage of the present invention is that it provides an additional functionality to the already existing KODAK photographic CD System image formats through the inclusion of image model data. The present invention maintains compatibility of image data with photographic CD data storage since the image data of the photographic CD system is utilized to store the image data in the present invention.

The image model data of the present invention differs in its content from the image data of a conventional photographic CD. The photographic CD data contains in a hierarchical structure the YCC 24-bit color information of an image. The image model data of the present invention is not restricted to being color information, and in particular can be range data. The range data describes the distances of pixels to a base reference surface. Thus, for each pixel in a 24-bit photographic CD image, there will be an associated piece of range information.

The availability of image model data in digital form enables operations to be performed on image data to generate new images with the objects contained in the original images. The storage of the image data and image model data allows the new images to be generated by a computer graphics system which differ from the original image in a variety of ways including, but not limited to, views of the objects from different perspectives, under different lighting, or as if the object was made of a different material.

Other objects, advantages and novel features of the present invention will become apparent from the following detailed description of the invention when considered in conjunction with the accompanying drawings.

DETAILED DESCRIPTION OF A PREFERRED EMBODIMENT

Figures 1, 2:
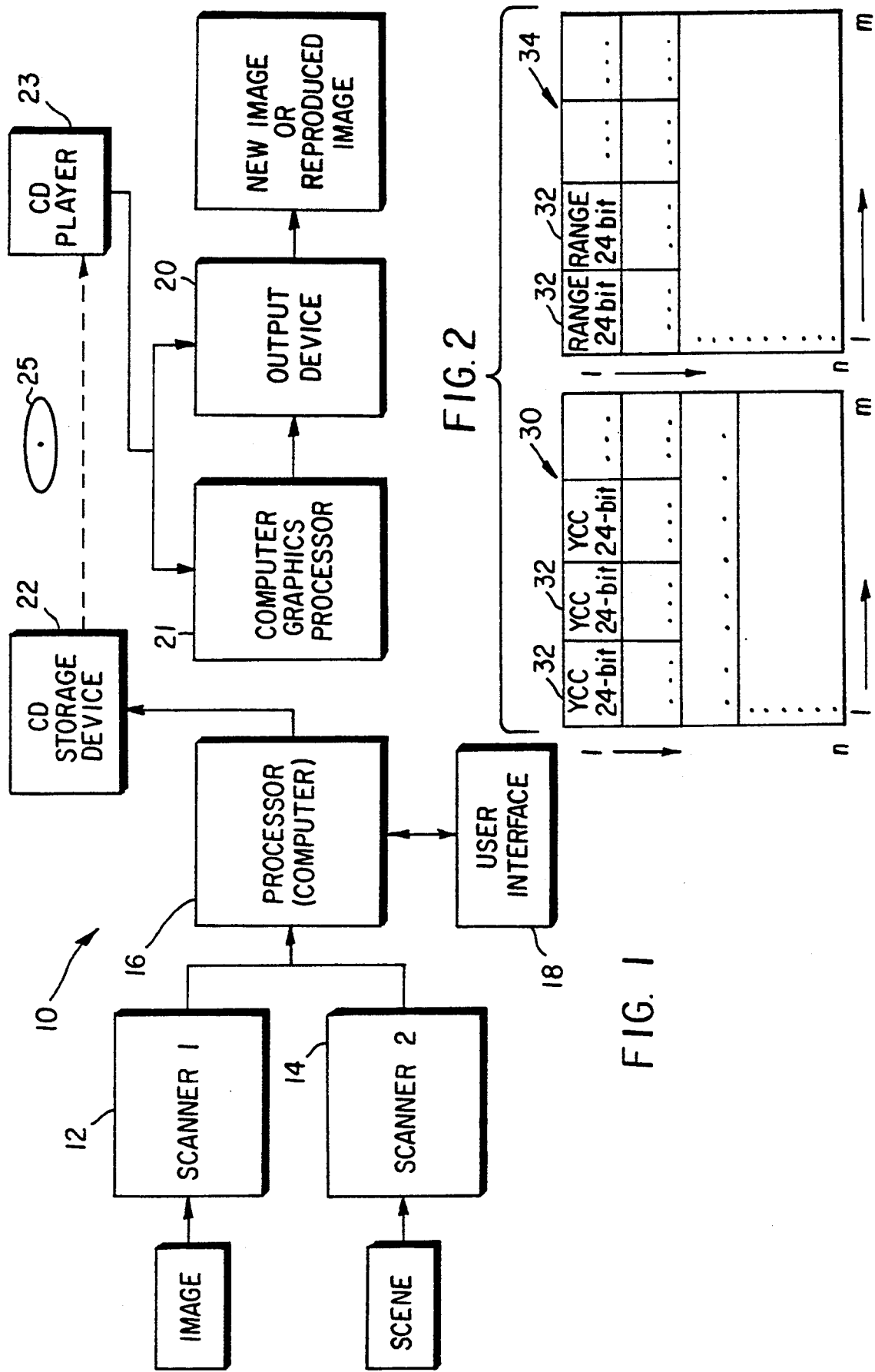
FIG. 1 is a block diagram of an arrangement constructed in accordance with an embodiment of the present invention.
FIG. 2 is a schematic illustration of two image units representing the same image.

FIG. 1 illustrates in block diagram form an arrangement for carrying out the present invention. The arrangement 10 has a first scanner 12, a second scanner 14, and a computer 16 which receives digitized information regarding an image or a scene from the scanners 12, 14. The computer 16 can be controlled through a user interface 18. When an image or a scene is to be stored, the digitized information is provided to a CD storage device 22 that writes the information on a photo compact disk (CD) 25. When an image is to be printed or displayed, the digitized information representing the image or scene is provided to an output device 20, which can be a standard television, a high-definition television, a thermal printer, or a high-resolution printer, for example. This digitized information stored on the photographic CD 25 is sent to the output device 20 from a CD player 23. Alternatively, the digitized information is first sent to a graphics processor 21 which allows a user to manipulate the image and/or generate a new image from the digitized information, before being sent to the output device 20.

In the method for processing and storing image data (i.e. conventional color data) for an image described in U.S. Pat. No. 4,969,204, incorporated by reference, the image data scanned and stored is conventional color data, such as YCC data, and is stored in a 24-bit format. In this instance, the scanner 12 is a conventional color scanner. The photographic CD 25 contains files which store different information, such as the individual image packs of different resolution versions of a single image, an overview or index file which contains low-resolution versions of all of the images on the photographic CD 25, and a file with global information about the photographic CD 25, such as its date of creation, etc.

For the present invention an "image unit" is defined as a hierarchical data structure for an $n \times m$ pixel region. For the known photographic CD method described above, the only type of image unit is the image itself. The present invention, however, extends the usefulness of the photographic CD method to other types of image units. These image units may contain image model data such as range data. Other types of data that could be placed into an image unit include: color image data (YCC, RGB, XYZ, any color space); high bit-depth monochrome (B/W, infrared, ultraviolet); multi-spectral imaging; transparency; reflectivity; index of refraction; surface roughness and texture pattern; specularity; local curvature and surface normals; albedo; illuminance and illuminance direction; bi-directional reflectance distribution function; and any codes corresponding to material or feature properties stored directly or indirectly through code-based look-up tables.

The scanner 14, (as well as scanner 12), is therefore a scanner or sensor that provides this other information about a scene in a digitized form. Thus, the scanner 14 can be a range scanner, for example. Where there is to be a correspondence between two image units, the image (such as a photograph) scanned by the scanner 12 will be an image of the scene scanned by scanner 14. It is also possible for this other information to be input directly into the computer 16 from a storage medium or a sensing unit that provides digital values at corresponding pixel locations of an image.

Schematic illustrations of an image unit containing image data and an image unit containing image model data are provided in FIG. 2. The image unit 30 contains the image data, i.e. conventional color data, such as YCC data, and represents an image divided into $n \times m$ pixels 32. Each pixel 32 is encoded as twenty-four bits of YCC information.

The image unit 34 contains image model data, such as range data. For purposes of conformance and ease of performance with the existing photographic CD formatting, this image model data is also provided in twenty-four bits for each of the $n \times m$ pixels. In this example, the image units 30 and 34 represent the same objects since there is a correspondence between the image and the scene, but with different information (color and range). From these two image units 30 and 34, a three-dimensional image can be constructed.

It should be apparent that image units do not have to contain image data (i.e. color data) in order to be output, nor does the image unit need to be associated with an image data image unit. For example, if a photographic CD were to contain nothing but range units, no color data would need to be present in order to output a sequence of viewable image. Each image of an image unit is displayable as a color image, although some representations may be difficult to interpret. For range image units, the resulting image would be relatively easy to interpret as a color contour map. On the other hand, representations of reflectivity or other data types stored in image units may be more abstract.

In order to optimally use the different types of information contained in the different image units representing an image, there needs to be some sort of association, or "linking" of the image units. The present invention uses one or more of the files available on the photographic CD 25 to provide this linking, such as would be between the image data and range data of the same object. One method of linking the images would be to tag the files in the existing photographic CD organization file to add information that would indicate the image model type and linkages to other images. This could be done, for example, in a separate linkages directory, or in an existing directory.

For example, consider two image units stored as IMG01 and IMG02 where the first image unit is conventional photo YCC data and the second image unit represents range data for the same scene. The text entry of the files in the directory corresponding to the images could begin with 01IMAGE02RANGE. Thus, when the image is accessed for printing, display or manipulation, both IMG01 and IMG02 will be accessed.

Although the simplest example of two linked image units containing color and range data has been described above, this example is not to be taken as limiting. Many other types of linkages can be made for different purposes. For example, by linking image units that are spatially equivalent, but temporally different, motion of an object in an image can be seen. Or, one image unit containing range data can be linked with separate image units containing different color data, such as illumination indoors and natural illumination.

Tagging image data taken at different orientations (viewpoints) allows a depth imaging process to be readily performed. For example, twelve different image data image units representing different orientations of a single scene can be tagged as a depth image. When it is desired to process the image, the twelve images that have been tagged as depth images are accessed and merged in a variety of manners such as end to end, or by an interlacing (line 1 from image unit 1, line 2 from image unit 2, etc.). See, for example, *Electronic 3-D Imaging*, G. R. Chamberlain et. al., Proceedings of the Third International Conference on Holographic Systems, Components and Applications, 1991, pp 16–19 for a discussion of combining images to create a depth image.

Figure 3:
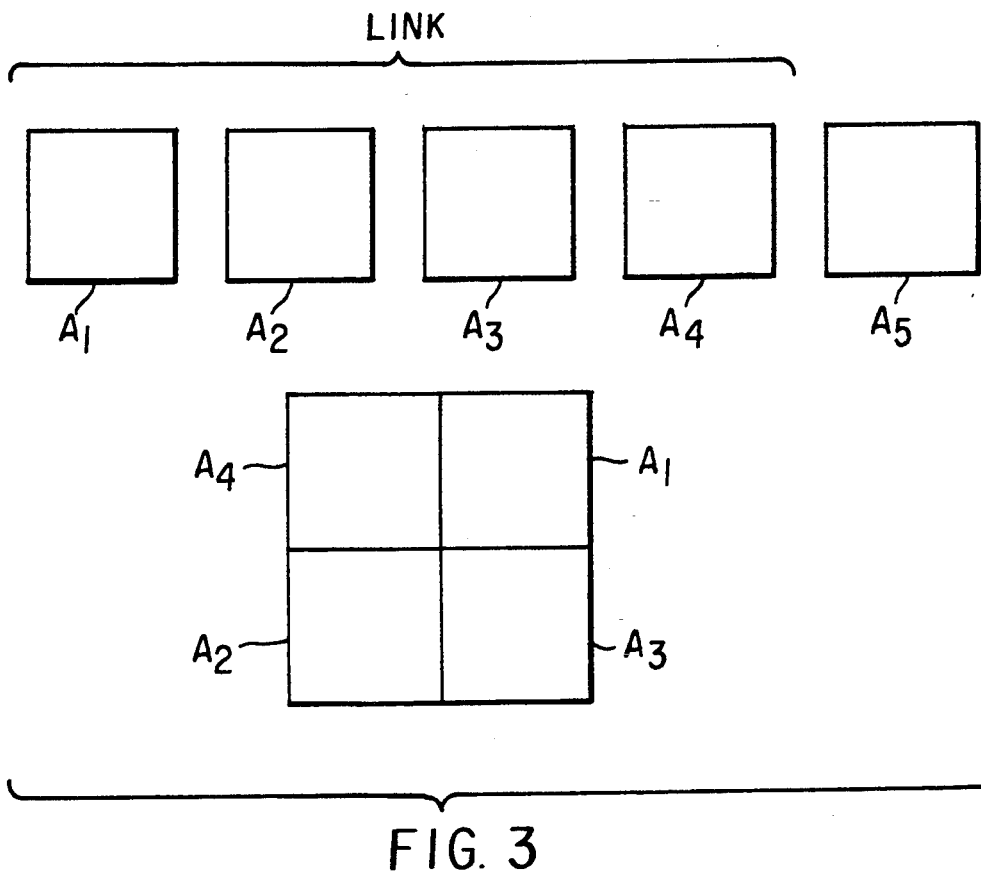
FIG. 3 is a block diagram of linked images and a collage of these linked images.

Another example illustrated in FIG. 3 shows the linking of four image units $A_1$–$A_4$ in a manner that indicates their positions in a collage of image units. The linkage, performed by the computer 16 at the direction of a user through the user interface 18, indicates which four image units (all of size $n \times m$ pixels) stored on the photographic CD 25 and the positions of these image units in a composite image of higher resolution ($2n \times 2m$ pixels). Linkage thus allows for storage of images with resolutions higher than the usual maximum size.

The merging, or "collaging" of images can be performed in any of a number of known image splicing mechanisms applied to the present invention, such as by alternating pixels from different image units of a linked sequence of image units, or by alternating lines from different image units. The example given in FIG. 3 is just one example of collaging.

Figure 4:
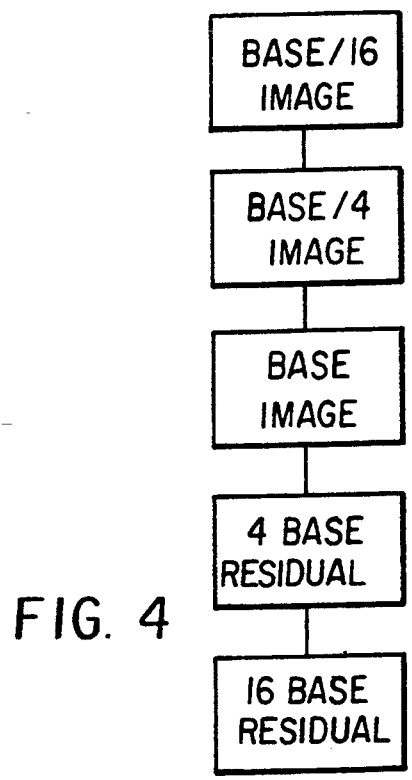
FIG. 4 illustrates an exemplary hierarchy of resolution for images.

Clearly, access to the image units other than color data could be structured in a hierarchical resolution format such as that shown in U.S. Pat. No. 4,969,204 and in FIG. 4. The image units can also be stored in more conventional fashion, such as in line-by-line formats, well known to those of ordinary skill in the art. In addition, a fast retrieval of 8 bits per entry rather than 24 bits can be performed. For example, consider the image unit for image data as implemented on the photographic CD system and the image unit for a possible range data format of the present invention. The Y channel of the YCC data is associated with the grey level of a photographic CD image. A black and white image is obtained by sampling only the 8-bit Y channel. Since the range data image unit has an identical data structure with the exception of a substitution of 24-bit color YCC data by the 24-bit range information, then an 8-bit sampling of range data results in a color-contour map of the ranges of image pixels.

For the output of an image by the output device, the 24 bit representation of each value for a pixel is converted into an actual value for a z-buffer. As one of ordinary skill in the art can appreciate, this can be performed by a trivial linear mapping or by more complicated mathematical conversions such as with polynomials, logarithms and exponents. "Reserved values" may be used to convert background pixels which are considered to be at an infinite range.

One of the major advantages of providing image model data for the photographic CD is the possibility of exploiting this data by a computer graphics system 21. There are a large number of computer graphics systems available at the time of this writing. Examples of such systems are Waterfront TM, Alias TM that operate on Silicon Graphics computers, and MacRenderMan TM for a Macintosh from Pixar. Any of these packages could serve as a computer graphics rendering system for use with the present invention.

The generation of a new image from the stored image data and the image model data occurs via a computer graphics process. The stored image data can be used by the computer graphics system 21 along with additional image model data such as object location, surface characteristics, lighting and viewpoint in order to set up the scene for a new image calculation. For example, the stored image data and image model data could be a frontal view of a face illuminated by white indirect light. Using the stored image data and image model data, a new image could be generated of the face in profile with late evening sunlight.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for generating images comprising:
a processor that receives digital information representing an image or scene, wherein the digital information includes at least two different image units of the image or scene, each image unit containing different information regarding the image or scene, and links the different image units of the image or scene for storage in a database such that the different image units of the image or scene are automatically accessed when the image or scene is accessed;

a storage device that stores the different image units of the image in a database; and an output device for producing an output image from the different image units of the image or scene stored in the database; and wherein one of the image units includes luminance add chrominance information and one of the image units includes range information.

2. An arrangement for generating images comprising:

a processor that receives digital information representing an image or scene, wherein the digital information includes at least two different image units of the image or scene, each image unit containing different information regarding the image or scene, and links the different image units of the image or scene for storage in a database such that the different image units of the image or scene are automatically accessed when the image or scene is accessed;

a storage device that stores the different image units of the image in a database; and an output device for producing an output image from the different image units of the image or scene stored in the database, further comprising: a color scanner coupled to the processor, the color scanner providing luminance and chrominance information as a portion of the digital information; and a range scanner coupled to the processor, the range scanner providing range data information as another portion of the digital information.

3. A method generating a digital image of an object, said digital image being comprised of a matrix of image pixels, each pixel being represented by an associated digital code, and wherein said digital image contains attributes obtained from a plurality of respectively different information sources, comprising the steps of:

(a) storing in a digital data storage medium a first digital image respective pixels of which have associated digital codes representative of a first aspect of said object obtained from a first information source;

(b) storing in said digital data storage medium a second digital image respective pixels of which have associated digital codes representative of a second aspect of said object obtained from a second information source, different from said first information source; and (c) accessing each of said first and second digital images from said digital data storage medium and controlling the activation of a matrix of pixels of an output display device in dependence upon pixel-associated digital codes of the respective first and second digital images stored in steps (a) and (b), respectively.

4. A method according to claim 3, wherein step (a) comprises storing in said digital data storage medium a first digital image, respective pixels of which have associated digital codes representative of a luminance and chrominance composition of an image of said object obtained from a first imaging device, and wherein step (b) comprises storing in said digital data storage medium a second digital image, respective pixels of which have associated digital codes representative of said second aspect of said object, which second aspect of said object is other than either the luminance or chrominance composition thereof.

5. A method according to claim 3, wherein said second aspect of said object corresponds to range information.

6. A method according to claim 3, wherein step (a) comprises storing in said digital data storage medium a first digital image, respective pixels of which have associated digital codes representative of a first image of said object obtained from an image capture device at a first point in time, and wherein step (b) comprises storing in said digital data storage medium a second digital image, respective pixels of which have associated digital codes representative of said second image of said object obtained from an image capture device at a second point in time, different from said first point in time.

7. A method according to claim 3, wherein step (a) comprises storing in said digital data storage medium a first digital photographic image, respective pixels of which have associated digital codes representative of a luminance and chrominance composition of a photographic image of said object obtained from a photographic imaging device, and wherein step (b) comprises storing in said digital data storage medium a second, non-photographic, digital image, respective pixels of which have associated digital codes representative of said second aspect of said object, which second aspect of said object is other than photographic image information.

8. A method according to claim 3, wherein step (a) comprises storing in said digital data storage medium a first digital non-photographic image, respective pixels of which have associated digital codes representative of a first aspect of an object other than either luminance or chrominance photographic characteristics thereof, and wherein step (b) comprises storing in said digital data storage medium a second non-photographic digital image, respective pixels of which have associated digital codes representative of said second aspect of said object, different from said first aspect of said object and also other than either luminance or chrominance photographic characteristics thereof.

9. A method according to claim 3, further including the step of storing in said digital data storage medium linking digital data which links said first and second images with one another such that accessing of either of said images causes the other image to be accessed, and wherein step (c) includes reading the contents of said linking digital data, so as to cause each of said first and second digital images to be read out from said storage medium.

10. For use with a digital image processing system, in which multiple digital images of an object are accessed from a digital data storage medium and combined into a composite digital image for display by way of an image display device, said composite digital image being comprised of a matrix of image pixels, each pixel being represented by an associated digital code, and wherein said composite digital image contains attributes of said object obtained from a plurality of respectively different information sources, a storage arrangement of said multiple digital images on said digital data storage medium comprising:

a first digital image data file, stored in a first portion of said digital data storage medium and containing a plurality of digital codes associated with respective pixels of a first digital image, representative of a first aspect of said object obtained from a first information source; and a second digital image data file, stored in a second portion of said digital data storage medium, separate from said first portion thereof and containing a plurality of digital codes associated with respective pixels of a second digital image representative of a second aspect of said object obtained from a second information source, different from said first information source.

11. A storage arrangement according to claim 10, wherein said first digital image data file has associated digital codes that are representative of a luminance and chrominance composition of an image of said object obtained from a first imaging device, and wherein said second digital image data file has associated digital codes that are representative of said second aspect of said object, which second aspect of said object is other than either the luminance or chrominance composition thereof.

12. A storage arrangement according to claim 11, wherein said second aspect of said object corresponds to range information.

13. A storage arrangement according to claim 10, wherein said first digital image data file has associated digital codes that are representative of a first image of said object obtained from an image capture device at a first point in time, and wherein said second digital image data file has associated digital codes that are representative of said second image of said object obtained from an image capture device at a second point in time, different from said first point in time.

14. A storage arrangement according to claim 10, wherein said first digital image data file contains a plurality of digital codes representative of a luminance and chrominance composition of a photographic image of said object obtained from a photographic imaging device, and wherein said second digital image data file contains a plurality of digital codes representative of said second aspect of said object, which second aspect of said object is non-photographic image information.

15. A storage arrangement according to claim 10, wherein said first digital image data file contains a plurality of digital codes representative of a first digital non-photographic image, respective pixels of which have associated digital codes representative of a first aspect of an object other than either luminance or chrominance photographic characteristics thereof, and wherein said second digital image data file contains a plurality of digital codes representative of a second digital non-photographic image, respective pixels of which have associated digital codes representative of said second aspect of said object, different from said first aspect of said object and also other than either luminance or chrominance photographic characteristics thereof.

16. A storage arrangement according to claim 10, wherein said digital data storage medium has stored therein linking digital data, which links said first and second digital image data files with one another, such that accessing of either of said first and second digital image data files causes the other digital image data file to be accessed from said digital data storage medium.

17. For use with a digital image processing system, in which multiple digital images of an object are stored on and accessed from a portable digital image recording medium and coupled to an image display device to produce a composite digital image containing attributes of each of said multiple digital images, said composite digital image being comprised of a matrix of image pixels, each pixel being represented by an associated digital code, and wherein said multiple digital images of said object contain information obtained from respectively different information sources, a storage arrangement of said multiple digital images on said portable digital image recording medium comprising:

a first digital image data file, stored in a first portion of said portable digital image recording medium and containing a plurality of digital codes associated with respective pixels of a first digital image, representative of a first aspect of said object obtained from a first of said respectively different information sources; and a second digital image data file, stored in a second portion of said portable digital image recording medium, separate from said first portion thereof and containing a plurality of digital codes associated with respective pixels of a second digital image representative of a second aspect of said object obtained from a second of said respectively different information sources.

18. A storage arrangement according to claim 17, wherein neither of said first and second digital image files contains photographic image information.

19. A storage arrangement according to claim 17, wherein first digital image file contains photographic image information, whereas said second digital image file contains no photographic image information.

20. A storage arrangement according to claim 17, wherein said first and second digital image files contain respectively different photographic image information.

21. A storage arrangement according to claim 17, wherein said portable digital image recording medium has stored therein linking digital data, which links said first and second digital image data files with one another, such that accessing of either of said first and second digital image data files causes the other of said first and second digital image data files to be accessed.

22. A storage arrangement according to claim 17, wherein said portable digital image recording medium comprises a digital compact disc.

* * * * *